(12) United States Patent
Bodeau et al.

(10) Patent No.: US 6,260,808 B1
(45) Date of Patent: Jul. 17, 2001

(54) PASSIVE ELECTRICAL GROUNDING OF A SPACECRAFT TO THE AMBIENT PLASMA ENVIRONMENT

(75) Inventors: J. Michael Bodeau, Yorba Linda; Ray Stribling, Redondo Beach, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/177,408

(22) Filed: Oct. 23, 1998

(51) Int. Cl.[7] ........................................ B64G 1/44
(52) U.S. Cl. .................. 244/173; 244/1 A; 136/292; 361/218
(58) Field of Search .................. 244/158 R, 173, 244/1 A; 136/243, 244, 292; 361/218; 324/72

(56) References Cited

U.S. PATENT DOCUMENTS

| | | | |
|---|---|---|---|
| 3,984,730 | * 10/1976 | Hunter | 244/1 A |
| 4,755,231 | * 7/1988 | Kerland et al. | 136/292 |
| 5,241,836 | 9/1993 | Bly . | |
| 5,400,986 | * 3/1995 | Amore et al. | 244/173 |
| 5,520,747 | * 5/1996 | Marks | 244/173 |
| 5,594,325 | 1/1997 | Manner . | |
| 6,017,002 | * 1/2000 | Burke et al. | 244/173 |

FOREIGN PATENT DOCUMENTS 0 637 900 A1   7/1994  (EP) .

OTHER PUBLICATIONS

P. A. Robinson, Jr. et al, Spacecraft Charging Progress in the Study of Dielectrics and Plasmas, IEEE Transactions on Electrical Insulation, vol. 27, No. 5, Oct. 1992, XP–002144854, pp 944–960.

R.A. Bond et al, Space Plasma Interactions with High Voltage Solar Arrays and Large Structures, 8015 JBIS Journal of the British Interplanetary Society, 47 (1994) Apr., No. 4, London, GB, XP–000434126, pp 143–150.

A. Bogorad et al, Differential Charging Control on Solar Arrays for Geosynchronous Spacecraft, IEEE Transactions on Nuclear Science, vol. 40, No. 6, Dec. 1993, XP–002144855, pp 1542–1546.

(List continued on next page.)

*Primary Examiner*—Galen L. Barefoot

(57) ABSTRACT

A spacecraft includes a spacecraft base structure having an externally facing, electrically conducting spacecraft surface, with the spacecraft structure including a solar cell array. A grounding structure has an externally facing, electrically conducting plasma grounding surface, and an electrical ground extends between the plasma grounding surface and the spacecraft base structure. In space, the spacecraft is oriented with the plasma grounding surface facing the sun. Electron photoemission from the plasma grounding surface balances electron charging of that portion of the spacecraft surface that does not face the sun, preventing electrical charging of the spacecraft relative to the plasma environment.

20 Claims, 4 Drawing Sheets

OTHER PUBLICATIONS

A. Pedersen et al, Methods for Keeping a Conductive Spacecraft Near the Plasma Potential, Proceedings of the 17$^{th}$ ESL–AB Symposium on Spacecraft Plasma Interactions and their Influence on Field and Particle Measurements, Noordwijk, The Netherlands, Sep. 13–16, 1998 (ESA SP–198, publ. Dec. 1983), XP–000933813, pp 185–190.

G.T. Inouye, "Spacecraft Charging Model," *J. Spacecraft and Rockets*, vol. 12, No. 10, Oct. 1975, pp. 613–620.

R.D. Goldstein et al., "Use of ITO to Prevent Spacecraft Charging," *IEEE Transactions on Nuclear Science*, vol. NS–29, Dec. 1982, pp. 1621–1628.

C. Bowman et al., "ITO–Coated RF Transparent Materials for Antenna Sunshields—Space Environment Effects", *IEEE Transactions on Nuclear Science*, vol. 17, No. 6, Dec. 1990, pp. 2134–2137.

A. Bogorad et al., "Electrostatic Discharge Induced Thermo–Optical Degradation of Optical Solar Reflectors (OSRs)", *IEEE Transactions on Nuclear Science*, vol. 38, No. 6, Dec. 1991, pp. 1608–1613.

E.G. Mullen et al., "An Autonomous Charge Control System at Geosynchronous Altitude: Flight Results for Spacecraft Design Considerations," *IEEE Transactions on Nuclear Science*, vol. 34, No. 6, Dec. 1997, pp. 2188–2194.

Richard McCaffery, "PAS–6 Exhibits Same Design Flaw as Loral's Tempo", *Space News*, Oct. 20–26, 1997, p. 1 and completion of story.

Ira Katz et al., "Mechanism for Spacecraft Charging Initiated Destruction of Solar Arrays in GEO", AIAA 36th Aerospace Sciences Meeting & Exhibit, Jan. 12–15, 1998, pp. 1–5.

* cited by examiner

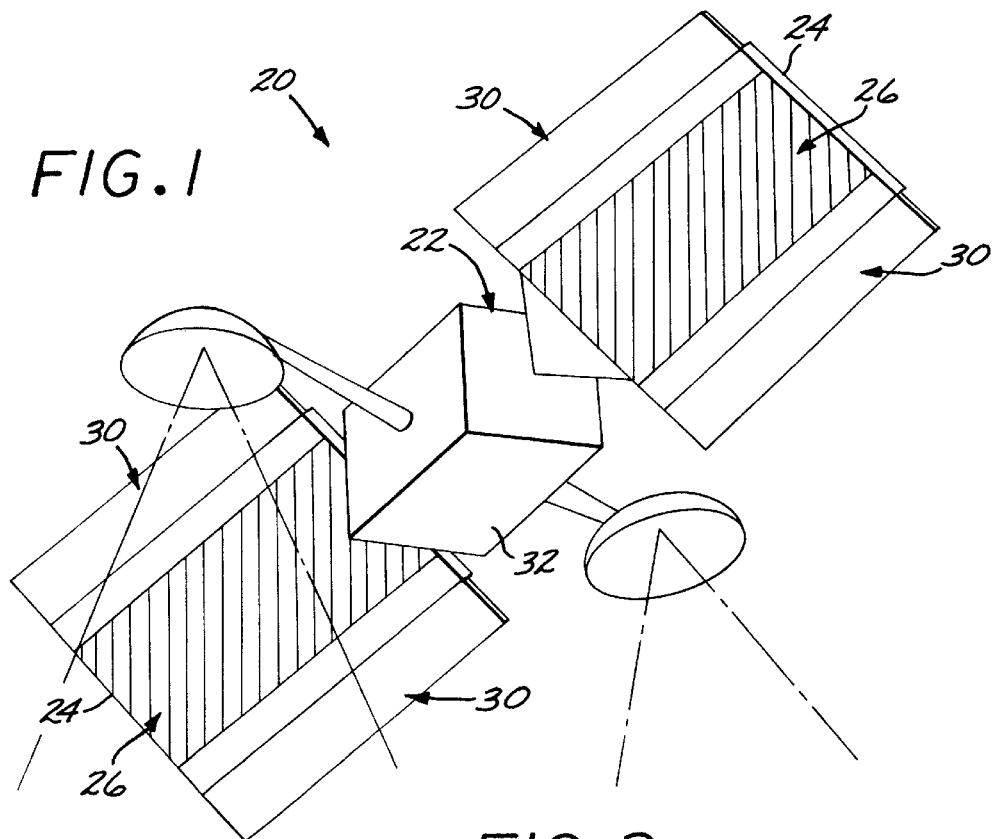
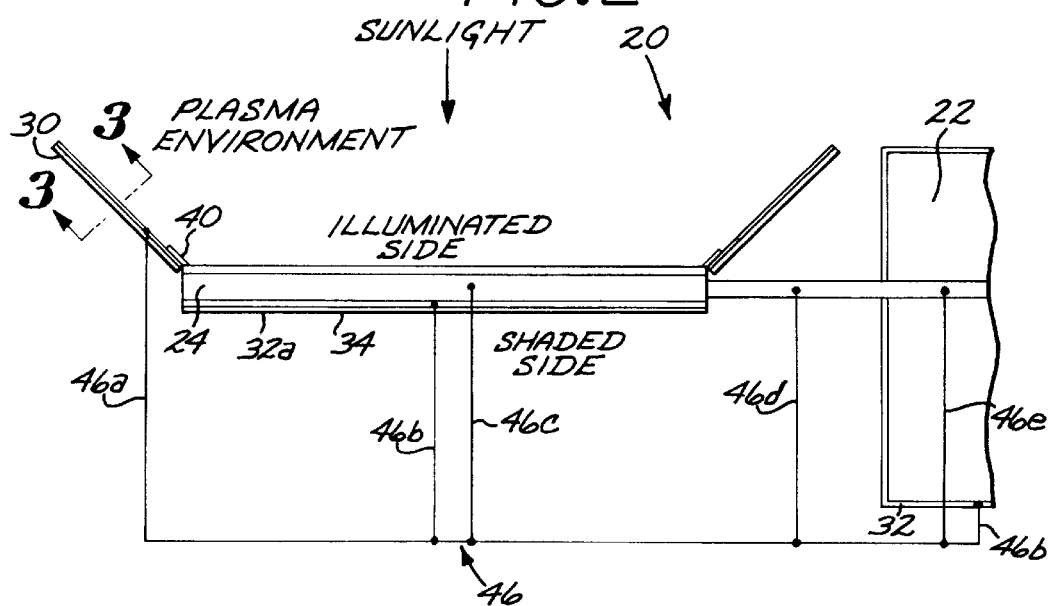

PASSIVE ELECTRICAL GROUNDING OF A SPACECRAFT TO THE AMBIENT PLASMA ENVIRONMENT

BACKGROUND OF THE INVENTION

This invention relates to the prevention of electrical charge buildup on a spacecraft.

Many current spacecraft include a body and large solar cell arrays, which are folded against the body for launch and thereafter deployed from the body as "wings". The solar cell arrays produce electrical power for the spacecraft. They are typically quite large in extent for spacecraft having high power consumption, such as geosynchronous communications satellites.

When a spacecraft is operated in space, imbalances in the collection and emission of electrical charge from the ambient environment can result in absolute charging between the spacecraft and its ambient plasma environment. Due to differences in the properties of exterior surface materials, the electrical charging can also cause differential charging between different parts of the spacecraft. If the electrical charges become sufficiently great, the resulting high voltages and electrical arcing may adversely affect the performance of electrical equipment on the spacecraft, degrade performance of the solar cell array, or even result in damage to the spacecraft structure.

Absolute electrical charging is a by-product of the interaction of a spacecraft with the varying flux of electrons and ions in the ambient space environment. A neutral surface in space collects a higher flux of electrons than positive ions. A spacecraft charges negatively in response to the net collection of negative charge, which enhances the collection of more ions and suppresses the collection of electrons. The negative charging continues until the net collection of ions and electrons reaches an equilibrium. A large geosynchronous spacecraft in eclipse can charge to 5,000–20,000 volts under disturbed environment conditions. Photoemission from sunlit surfaces returns a large flux of electrons to the ambient environment, offsetting the collection of electrons by surfaces that are in shadow. The electrically conductive portion of the shaded surface of the spacecraft tends to collect electrons from the plasma environment, and the electrically conductive portion of the illuminated surface tends to photoemit electrons into the plasma environment. During calm ambient environment conditions, photoemission from the conductive surfaces tends to emit more electrons than collected from the shadowed conductive surfaces, which causes a geosynchronous satellite to acquire a small positive charge in the range of a few volts. During disturbed, active ambient environment conditions, the electron collection from shadowed surfaces can overwhelm photoemission, leading to charging of the spacecraft to potentials in the kilovolt range.

Non-conductive materials in shadow collect electrons from the environment and charge negatively relative to the underlying structure, because the collected charge cannot flow to sunlit surfaces where it is photoemitted. Non-conductive sunlit materials photoemit large numbers of electrons and charge positively relative to the underlying structure because electrons cannot flow from the structure to the surface of the material. In both cases, differential voltages can result that lead to electrical arcs. Differential electrical charging between different parts of the spacecraft is controlled by providing the external surfaces of the spacecraft with sufficient electrical conductivity to equalize the charges over the surface. This electrical conductivity is imparted through the use of coatings on the surface materials of the spacecraft or the use of bulk additives within the surface materials. In both cases, the materials must acquire sufficient electrical conductivity to dissipate static charges.

Both passive and active approaches have been developed to aid in maintaining a neutral charge between the spacecraft and the plasma environment. Because the absolute charging phenomenon is related to the relative amounts of surface area that are shaded from the sun and are illuminated by the sun, the passive approaches must take into account the photoelectric behavior of the large-area solar cell arrays. The satellite is oriented so that the solar cells of the arrays always face the sun, so that there is a "front" side of the solar cell array facing toward the sun, and a "back" side facing away from the sun. The back side of the solar cell array is electrically conductive and accepts electrons from the plasma environment. The front side of the solar cell array includes a protective cover over the solar cells made of glass and other electrically nonconductive materials. Absent some further treatment for the front side of the solar cell array, the electrons collected on the back side of the array cannot flow to the surface of the electrically nonconductive covers on the front side, which would then photoemit the electrons. As a result, net absolute charging of the spacecraft occurs along with differential charging between the solar cell covers and the rest of the solar cell array.

To alleviate this charging, it has been known to apply a thin coating of an electrically conductive, transparent material, such as indium tin oxide (ITO), to the front side of the solar cell array over the cover glass in such a way that an electrical connection is made between the coating and the structure. The ITO-coated cover glass is a passive photoemitter, as was the uncoated glass. By providing a conductive path to the surface with the ITO coating, photoemission from the array front surface can thereby balance the net charge transfer with the plasma environment to prevent charging between the spacecraft and the plasma environment, and differential charging between the covers and the rest of the array. However, the ITO coating is not perfectly transparent and attenuates the sunlight incident upon the solar cell array, reducing its net efficiency. Charging protection is thereby achieved at the cost of reduced electrical production, so that even-larger solar cell arrays are required. As an alternative, active systems for monitoring the plasma environment and for responsively controlling charge accumulation have been proposed, but these tend to add weight to the spacecraft and have not been proved reliable for projected 15-year spacecraft lives.

The present approaches for controlling the buildup of charges and the associated high voltages and arcing are not fully acceptable, and satellite failures and/or degradations continue to occur as a result. Accordingly, there is an need for an improved approach to the control of spacecraft charging relative to the plasma environment. The present invention fulfills this need, and further provides related advantages.

SUMMARY OF THE INVENTION

The present invention provides a spacecraft protected against net charging of the spacecraft structure relative to the plasma environment. The approach of the invention adds no substantial amount of weight to the spacecraft, and in many cases may result in a weight reduction. The solar cell array covers are not coated with a transparent electrical conductor such as indium tin oxide, so that the light incident upon the solar cells is not attenuated and solar cell efficiency is not reduced. This approach is fully passive and highly reliable. It may be utilized by modifying existing structure in many cases.

In accordance with the invention, a spacecraft comprises a spacecraft base structure having an externally facing, electrically conducting spacecraft surface. The spacecraft base structure includes a solar cell array. A grounding structure is separate from the solar cell array and has an externally facing, electrically conducting plasma grounding surface. An electrical ground extends between the plasma grounding surface, the spacecraft base structure, and the electrically conducting spacecraft surface. In space, the spacecraft is oriented such that the plasma grounding surface faces the sun. Electron photoemission from the plasma grounding surface balances electron collection on the shaded portion of the spacecraft surface, preventing electron accumulation and charging relative to the plasma environment.

The preferred application of the present invention is a large communications satellite positioned in geosynchronous orbit when in service. (However, the term "spacecraft" is not so limited, and extends to other structures in orbit, including, but not limited to, vehicles in high inclination orbits, vehicles in low earth orbits, vehicles in polar orbits, solar imaging vehicles, interplanetary vehicles, and components such as antenna reflectors.) The sun-facing sides of the covers of the large solar cell arrays of the satellite need not be coated with a transparent electrical conductor, so that their net efficiency is not reduced. Instead, the separate grounding structure is provided to aid in charge dissipation to the plasma. The grounding structure is preferably a solar concentrator that is provided adjacent to, but separate from, each solar cell array, and is connected to the solar cell array by a structural support arm. The solar concentrator has a reflective surface that reflects sunlight toward the solar cells of the solar cell array. The reflective surface is made as a metallic layer that is electrically connected to the spacecraft base structure and the electrically conducting spacecraft surface that is shaded. With this approach, the solar concentrator, which is otherwise present to improve the efficiency of the solar cell arrays, also performs the charge-equalization and plasma-grounding functions. The electrical connection between the concentrator and the solar cell array is unnecessary to its function as a light reflector.

In other applications, other structure can be used to prevent charging relative to the plasma environment. For example, a solar sail used either for equalization of solar wind pressures or for spacecraft attitude control may be employed as the grounding structure. The electrical conductivity and photoemission present when the solar sail functions as a passive electrical ground are not necessary to its function as a solar sail. Other separate grounding structures may also be used.

The plasma grounding surface typically need not be as large as the shaded surface of the spacecraft, in order to equalize charge transfer to and from the spacecraft and the plasma environment. Because photoemission from a surface is typically ten to twenty times stronger than electron collection from the environment, the area of the grounding surface should be at least about $\frac{1}{10}$ of the total area of the spacecraft, in order to accomplish the grounding function. The plasma grounding surface is a bare electrical conductor, such as bare metal or bare electrically conductive composite material. The use of the uncoated surface results in reduced weight as compared with a coated surface. Application of nonconductive coatings or surface treatments to this plasma grounding surface defeats this invention.

The present invention thus provides a fully passive technique for grounding spacecraft to the ambient plasma environment. Charge buildup is prevented, without any loss in efficiency of the solar cells and without weight addition. Potential electrical degradation and/or damage to the spacecraft is avoided. Other types of adverse effects are avoided as well. For example, in spacecraft carrying large optical sensors, outgassing of the spacecraft produces gas that may be electrostatically attracted to the optical surfaces of the sensor if the spacecraft has an accumulated electrostatic charge. The utilization of the present invention reduces or prevents electrostatic attraction of the gas to the spacecraft, and the associated contamination of the optical system. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic perspective view of a spacecraft utilizing the approach of the invention;

FIG. 2 is a diagrammatic electrical circuit drawing of the spacecraft of FIG. 1;

DETAILED DESCRIPTION OF THE INVENTION

Figure 3:
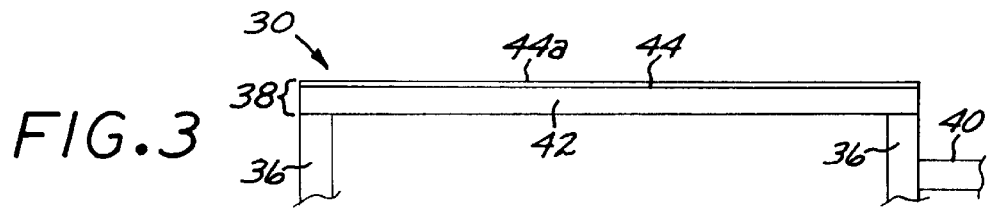
FIG. 3 is a sectional view of the solar concentrator, taken on line 3—3 of FIG. 2.

FIG. 1 depicts a spacecraft 20 having a spacecraft base structure including a spacecraft body 22, two solar panels 24 with solar cell arrays 26 mounted thereon, and two microwave antennas 28 mounted to the body 22. A pair of solar concentrators 30, which are not part of the spacecraft base structure as that term is used herein, are positioned on either side of each solar panel 24. The solar concentrators 30 reflect sunlight onto the solar panels 24, which sunlight otherwise would not fall onto the solar panels 24, thereby increasing the overall power output of the solar panels 24.

This spacecraft 20 is launched into geosynchronous earth orbit and serves as a communications relay for microwave signals. Signals are received on one of the antennas 28, amplified within the spacecraft body 22 by amplifiers powered by electricity produced by the solar cell arrays 26, and re-transmitted over the other of the antennas 28. Such satellites have an expected on-station lifetime of 15 years or more. While the spacecraft 20 is in orbit, it is immersed in an ambient plasma environment having free electrons. A concern with such spacecraft is that static electrical charging of the spacecraft immersed in the plasma field can interfere with the structure, with the reception/amplification/transmission of the microwave signals, and/or the performance of the solar cell arrays 26.

FIG. 2 depicts an embodiment of the present approach for controlling the electrical charging of the spacecraft 20. The spacecraft 20 has an externally facing spacecraft surface 32. Some of the surface 32 faces toward the sun and is illuminated by the sun when the spacecraft 20 is in orbit and functioning, and some of the surface 32 faces away from the sun and is shaded from the sun, as indicated in FIG. 2. At least a portion 32a of the surface 32 is made electrically conducting to dissipate static charges that otherwise would build up on the surface 32. The conducting portion 32a may be made conducting by forming it of a conductive material or coating it with a conductive coating 34. The conductive material may be, for example, a metal such as aluminum or an electrically conductive composite material such as graphite fibers in a resin (e.g., epoxy) matrix. The conductive coating 34 is typically a paint having an electrically conductive pigment dispersed in a binder. Such coatings in different colors, selected for thermal control purposes, are known in the art.

The solar concentrators 30, shown in greater detail in FIG. 3, are preferably formed as a support structure 36 with a reflective layer 38 supported thereon. The support structure 36 is supported from the solar panel 24 by a structural support arm 40. The reflective layer 38 typically is composed of a layer 42 of polyimide plastic, such as DuPont Kapton™ polymer sheet, about 0.001 inch thick coated with a layer 44 of metal such as aluminum about 1000–1500 Angstroms thick. The metal layer 44 is not painted or otherwise coated with a dielectric (electrical nonconductor) which would render it ineffective in emitting electrons by photoemission when illuminated by sunlight. The metal layer 44 serves two functions in the spacecraft 20. It reflects sunlight into the solar panels 24, and it serves as a plasma grounding surface 44a, as will be discussed subsequently.

FIG. 2 illustrates a set of electrical interconnections 46. In this embodiment, electrical grounding of the spacecraft to the plasma environment is accomplished by electrically interconnecting the metal layer 44 (interconnection 46a), the electrically conductive portion 32a of the surface 32 (interconnection 46b), the electrically conducting portion of the internal support structure of the solar panels 24 (interconnection 46c), the electrically conducting portion of the support arm 40 (interconnection 46d), and the electrically conducting portion of the internal support structure of the spacecraft body 22 (interconnection 46e). The electrical interconnections may be accomplished by any operable technique. Some of the electrical interconnection is typically accomplished by electrically conductive wires or straps, such as the interconnectors 46a–46e. Some of the electrical interconnection is also typically accomplished through and by the conductive surface 32a, which may be an electrical conductor or an electrically conductive coating or finish such as an electrically conductive black or white paint. In the latter case, the surface coating or finish preferably has an electrical resistivity of less than about $10^9$ ohms per square in order to provide sufficient electrical conductivity.

Figure 4:
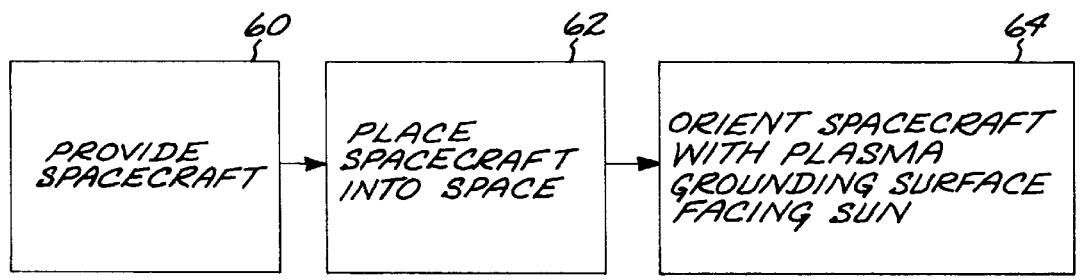
FIG. 4 is a block diagram of a preferred approach for practicing the invention.

The approach for preventing buildup of electrical charges is illustrated in FIG. 4. The spacecraft 20 is furnished, numeral 60, and placed into space, numeral 62. The spacecraft 20 is oriented so that the solar panels 24 face toward the sun. The plasma grounding surface 44a is thereby also oriented so that it faces toward the sun, numeral 64.

When the spacecraft 20 is so oriented, the portion of the surface 32a which is in shade receives and absorbs electrons from the plasma environment. The plasma grounding surface 44a is illuminated by sunlight, and emits some or all of these electrons by a photoemission process. Thus, any plasma grounding surface 44a is operable, and its presence has a beneficial effect on the reduction of electrical charge throughout the spacecraft. Preferably, the area of the plasma grounding surface is at least about 1/10 that of the total surface area of the spacecraft, to achieve a complete electrical grounding of the spacecraft to the plasma.

Figure 5:
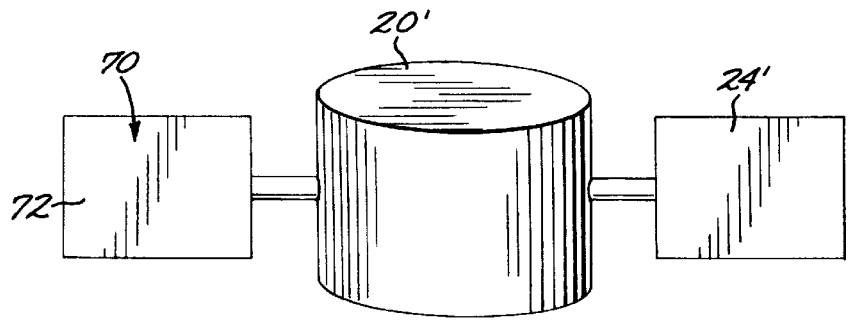
FIG. 5 is a schematic perspective view of another spacecraft utilizing the approach of the invention.

FIG. 5 illustrates another embodiment of the present invention. A spacecraft 20' has a single solar panel 24' extending therefrom. A solar sail 70 is mounted on the spacecraft 20' and is oppositely disposed to the solar panel 24'. The solar sail 70 serves to balance the pressure of the solar wind exerted on the solar panel 24'. By making the solar sail 70 with an electrically conductive plasma grounding surface 72 and grounding the surfaces and spacecraft base structure together, as described previously, the solar sail 70 also aids in dissipating the accumulated electrical charges and grounding the spacecraft to the plasma environment.

Figure 6:
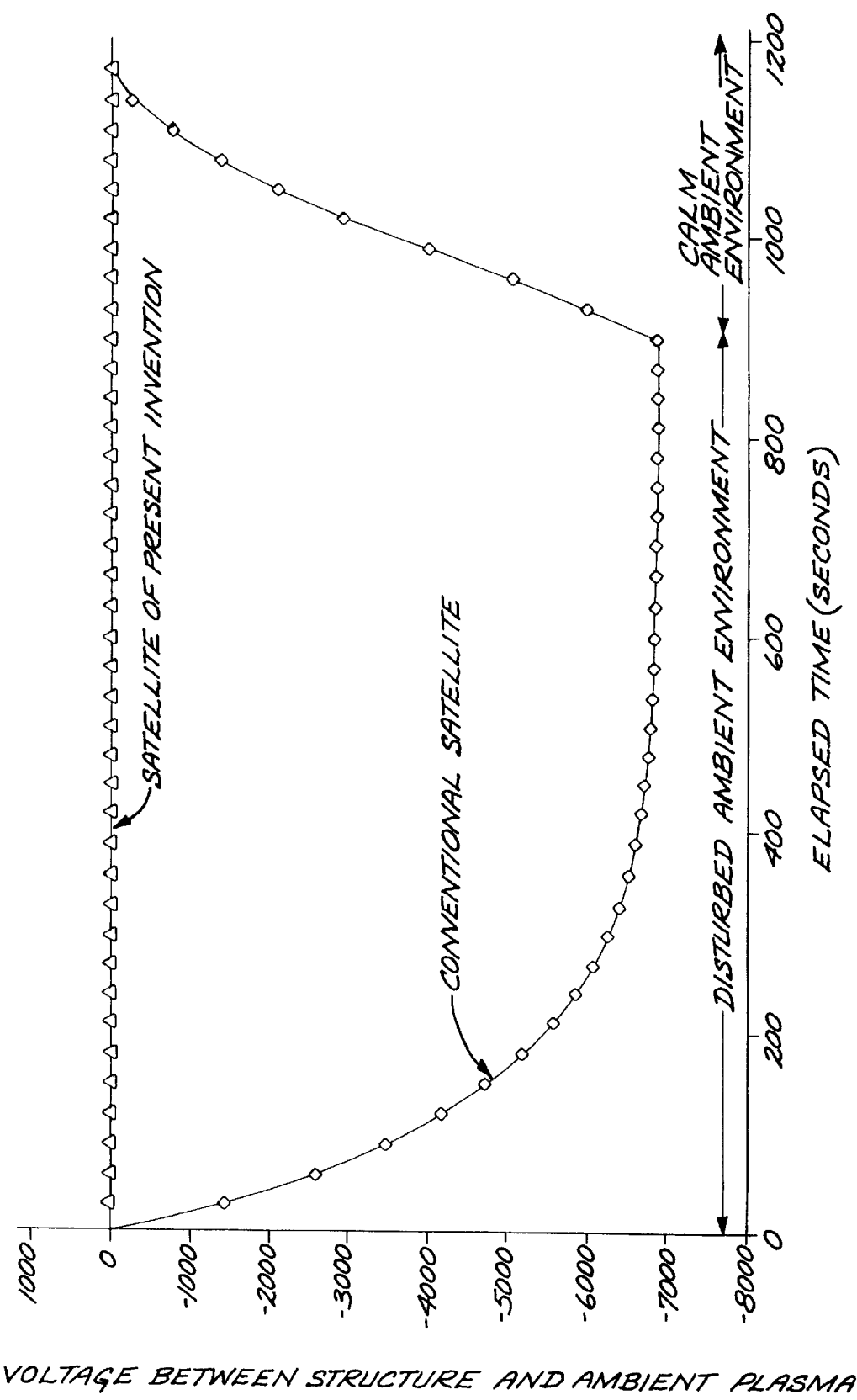
FIG. 6 is a graph illustrating the absolute voltage buildup between a satellite solar cell array structure and the ambient plasma environment.

The inventors have conducted analyses and simulations of the charging of a conventional geosynchronous communications satellites and a geosynchronous communications satellite which has been grounded to the ambient plasma environment according to the invention. FIG. 6 is a graph of the voltage difference between the structure of the solar cell array and the ambient plasma environment, during a period of disturbed ambient environment and a subsequent period of a calm ambient environment. (A "disturbed" ambient environment refers to the conditions sometimes experienced during geomagnetic substorms, which are transient conditions that typically occur every few days over the life of the satellite, and are related to the magnetic field of the earth. Because such a "disturbed" ambient environment is expected semi-regularly during the lifetime of the satellite, the satellite must be able to withstand its effects.) In these conditions, a conventional satellite experiences a voltage of nearly –7000 volts during the period of the disturbed ambient environment due to the imbalance of electron collection and photoemission. Under other conditions, the voltage may be even higher. A satellite grounded to the plasma environment according to the present invention has substantially no voltage buildup.

Figure 7:
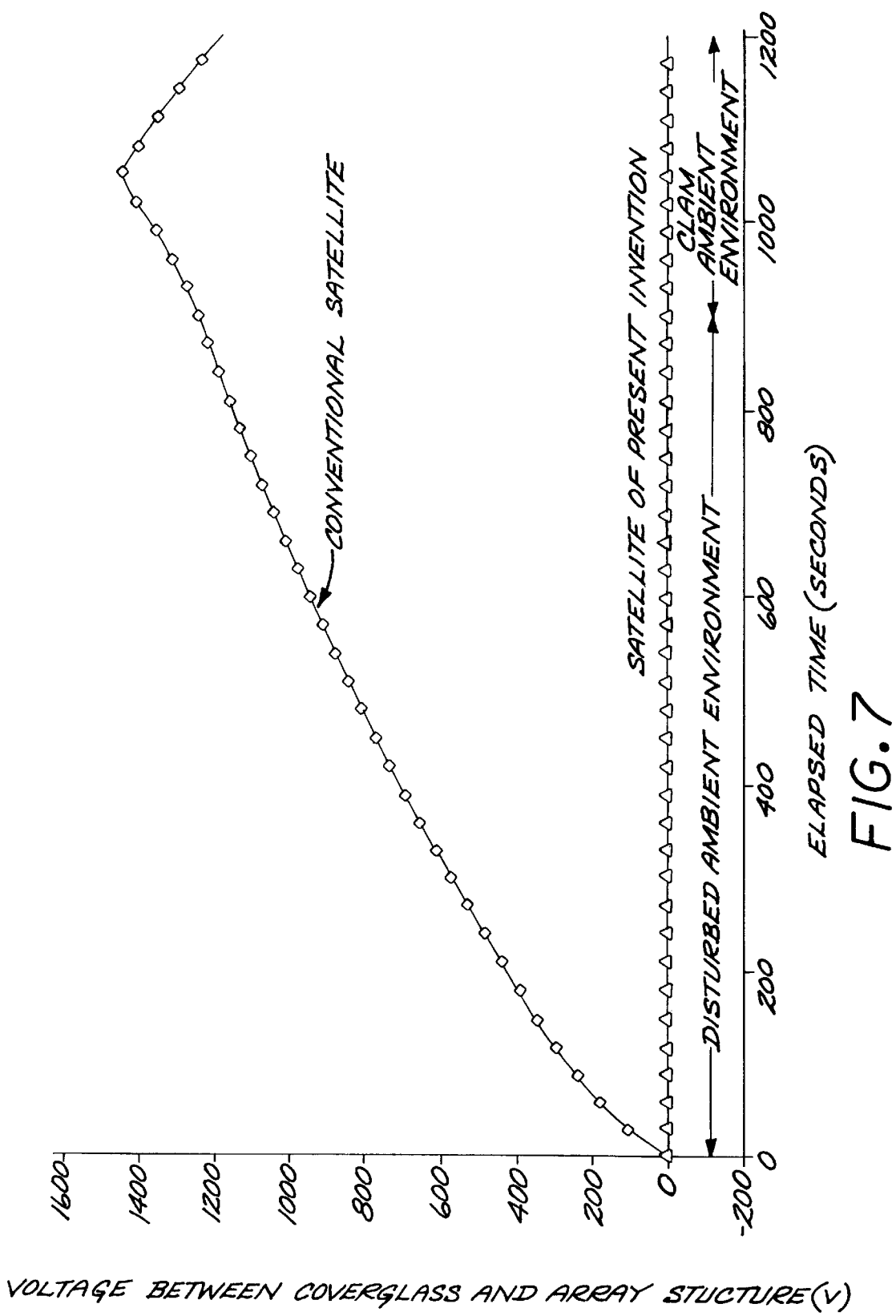
FIG. 7 is a graph illustrating the voltage differential between the cover glass of the solar cell array and the support structure of the solar cell array.

Similarly, as illustrated in FIG. 7, the differential voltage between the cover glass of the solar cell array and its underlying structure becomes quite large for the conventional satellite, but remains nearly constant for a satellite according to the present invention. In the conventional satellite, photoemission prevents the glass surface of the cover glass from charging relative to the plasma, but the underlying structure charges negatively (as shown in FIG. 6), resulting in a large voltage difference between the cover glass and the underlying structure. Laboratory tests have demonstrated that differential voltages of this magnitude produce electrical arcing. This type of arcing on the solar cell array and other spacecraft surfaces has caused degradation of array power output and even upsets to and degradation of spacecraft performance. In the spacecraft according to the present approach, on the other hand, the voltage differential remains substantially zero, both in disturbed and calm ambient plasma environments, because the structure and the nonconductive glass are independently held close to the potential of the ambient plasma environment.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A spacecraft, comprising:
   a spacecraft base structure comprising an externally facing, electrically conducting spacecraft surface, the spacecraft base structure including a solar cell array;

a grounding structure separate from the solar cell array and having an externally facing, electrically conducting plasma grounding surface; and an electrical ground extending between the plasma grounding surface, the spacecraft base structure, and the electrically conducting spacecraft surface.

2. The spacecraft of claim 1, wherein the spacecraft is a communications satellite.

3. The spacecraft of claim 1, wherein the grounding structure comprises a solar sail.

4. The spacecraft of claim 1, wherein the grounding structure comprises a solar concentrator.

5. The spacecraft of claim 1, wherein the spacecraft base structure comprises a spacecraft body, and a solar panel.

6. The spacecraft of claim 1, wherein the grounding structure is separate from the spacecraft base structure, but is connected to the spacecraft base structure by a structural support arm.

7. The spacecraft of claim 1, wherein the plasma grounding surface comprises a metal.

8. The spacecraft of claim 1, wherein the plasma grounding surface has a grounding surface area and the spacecraft surface has a spacecraft surface area, and wherein the grounding surface area is at least about $1/10$ of the spacecraft surface area.

9. The spacecraft of claim 1, wherein the electrical ground comprises a freestanding electrical conductor.

10. The spacecraft of claim 1, wherein the electrical ground comprises a surface finish having an electrical resistivity of less than about $10^9$ ohms per square.

11. A method of preventing a buildup of electrical charges on a spacecraft, comprising the steps of:

providing a spacecraft comprising a spacecraft base structure comprising an externally facing, electrically conducting spacecraft surface, and further including a solar cell array, a grounding structure separate from the solar cell array and having an externally facing, electrically conducting plasma grounding surface, and an electrical ground extending between the plasma grounding surface, the spacecraft base structure, and the electrically conducting spacecraft surface; and placing the spacecraft into space; and orienting the spacecraft with the plasma grounding surface facing toward the sun.

12. The method of claim 11, wherein the step of placing the spacecraft into space includes the step of placing the spacecraft into a geosynchronous earth orbit.

13. The method of claim 11, wherein the grounding structure comprises a solar sail.

14. The method of claim 11, wherein the grounding structure comprises a solar concentrator.

15. The method of claim 11, wherein the spacecraft base structure comprises a spacecraft body, and a solar panel.

16. The method of claim 11, wherein the grounding structure is separate from the spacecraft base structure, but is connected to the spacecraft base structure by a structural support arm.

17. The method of claim 11, wherein the plasma grounding surface comprises a metal.

18. The method of claim 11, wherein the plasma grounding surface has a grounding surface area and the spacecraft surface has a spacecraft surface area, and wherein the grounding surface area is at least about $1/10$ of the spacecraft surface area.

19. The method of claim 11, wherein the electrical ground comprises a freestanding electrical conductor.

20. The method of claim 11, wherein the electrical ground comprises a surface finish having an electrical resistivity of less than about $10^9$ ohms per square.

\* \* \* \* \*